[54] TIME DIVISION MULTIPLEXER EMPLOYING DIGITAL GATES AND A DIGITAL-TO-ANALOG CONVERTER

[75] Inventors: Clayborne E. Myers, Oviedo; Arthur E. Vreeland, Eau Gallie, both of Fla.

[73] Assignee: International Telephone and Telegraph Corporation, Nutley, N.J.

[22] Filed: Aug. 17, 1972

[21] Appl. No.: 281,602

[52] U.S. Cl. .......... 340/347 AD
[51] Int. Cl. .......... H03k 13/20
[58] Field of Search .......... 340/347 AD, 347 DA; 325/38 R

[56] References Cited

UNITED STATES PATENTS 3,582,940 6/1971 Kihlberg .......... 340/347 AD

*Primary Examiner*—Thomas A. Robinson
*Attorney, Agent, or Firm*—John T. O'Halloran; Menotti J. Lombardi, Jr.; Edward Goldberg

[57] ABSTRACT

This invention relates to a high frequency multi-channel time division multiplexer employing digital gates and a digital-to-analog converter. An analog voltage is continuously applied to one input of an analog comparator. The output of a digital-to-analog converter is applied to the other comparator input. A sequencer turns a first channel digital gate ON, and a 10 bit binary number representing the input voltage is produced using the conventional half-split approximation technique. After the conversion has been completed, the digital gate in the next channel is switched ON and the process is repeated. The 10 bit binary number is stored in the digital-to-analog converter and made available in parallel form at the end of each conversion. When the last channel has been converted, the sequencer again energizes channel 1. The output multiplexer output is a PCM wave train.

3 Claims, 4 Drawing Figures

TIME DIVISION MULTIPLEXER EMPLOYING DIGITAL GATES AND A DIGITAL-TO-ANALOG CONVERTER

BACKGROUND OF THE INVENTION

This invention relates to a time division multiplexer and more particularly to a sequential time division multiplexer employing digital gates and a digital-to-analog converter.

Conventionally, time division multiplexers employ electronic analog gates which require that the gates be sequentially switched ON one at a time. Ideally, the multiplexer output at any given time will be at precisely the same potential as the input to the ON gate. Any deviation in output voltage from the input to the ON gate represents error caused by the multiplexer. In order for the ON gate input and the multiplexer output to be precisely the same at all times, the analog switches would have to be perfect, i.e., switches would contain zero impedance in the ON position and infinite impedance in the OFF position. The errors which result using analog gate become significant in high speed (20 kc and up) multi-channel (100 channels) systems unless complex and expensive precautions are taken. A multi-channel system of this type might be used, for instance, in environmental measurement systems such as are used in the space program for monitoring fuel and pressure systems, temperature, and strain and stress on the launcher umbilical tower.

SUMMARY OF THE INVENTION

It is an object of the present invention to provide a time division multiplexer which avoids the above-described voltage error without the use of complex and expensive equipment.

It is a feature of the invention that the voltage error be avoided through the use of digital gates instead of electronic analog gates.

According to a broad aspect of the invention there is provided an improved multi-channel time division multiplexer for multiplexing a plurality of analog signals and generating a PCM output and a parallel digital output using the half-split approximation process, comprising a digital-to-analog converter having an input, an analog output and a plurality of parallel digital outputs, a plurality of analog comparators, one in each channel, having first and second inputs, said first input coupled to a different one of said plurality of analog signals and said second input coupled to the analog output of said digital-to-analog converter, and having a bistable output which assumes a first state if said analog signal is greater than said digital-to-analog converter analog output and a second state if said analog signal is less than said digital-to-analog converter analog output, a plurality of digital gates, one in each channel, having first and second inputs and an output, said first input coupled to the output of said analog comparator in the same channel and said output coupled to the outputs of the remaining digital gates, for forming said multiplexer PCM output and said digital-to-analog converter input and a sequencer control unit having a first plurality and second plurality of outputs, each of said first plurality consisting of pulses at channel rate, coupled to said second input of one of said plurality of digital gates, and said second plurality, consisting of pulses at bit rate, coupled to said digital-to-analog converter, whereby the voltage of each of said analog signals is converted into an n-bit binary number.

The above and other objects of the present invention will be better understood from the following detailed description taken in conjunction with the accompanying drawings in which:

DESCRIPTION OF THE PREFERRED EMBODIMENT

Figure 1:
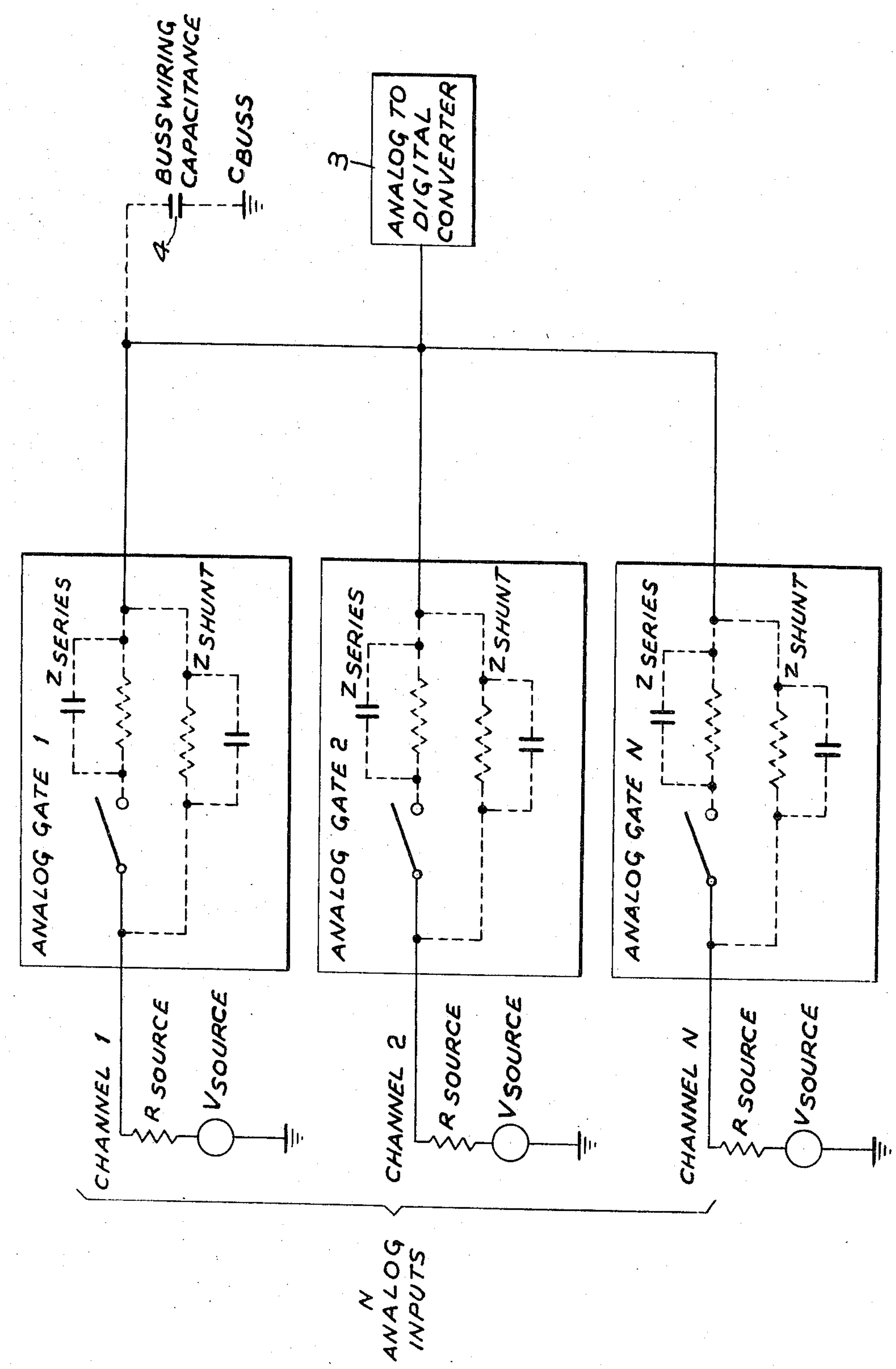
FIG. 1 is a block and circuit diagram of a time division multiplexer using analog gates according to the prior art.

FIG. 1 is a simplified diagram of a time division multiplexer using analog gates according to prior art. Also shown are the impedance parameters associated with electronic analog gates. The multiplexer of FIG. 1 comprises n input channels each of which are applied to a respective analog gate. The input to each channel is an analog input, and the output of each analog gate is applied sequentially to an analog-to-digital converter 3.

Electronic gates of the type shown in FIG. 1 do not represent perfect switches. As shown, the gates contain both series impedance ($Z_{series}$) and shunt impedance ($Z_{shunt}$). These switch imperfections in conjunction with finite source impedances ($R_{source}$) and output buss capacitance 4 ($C_{buss}$) cause errors of significant magnitude in high speed systems unless, as stated above, special precautions are taken. At the instant an analog gate is switched on, the output buss voltage cannot instanteously change to the input value because $C_{buss}$ must be charged and the source must also drive the shunt impedance of all the OFF gates. This drive current must flow through the source impedance and the ON switch series impedance causing a voltage error at the analog buss. Typical values of $Z_{series}$, $Z_{shunt}$, $C_{buss}$, and $R_{source}$ are such that the analog buss voltage error becomes significant in high speed (20 kc and up) multi-channel (100–200 channel) systems.

Figure 2:
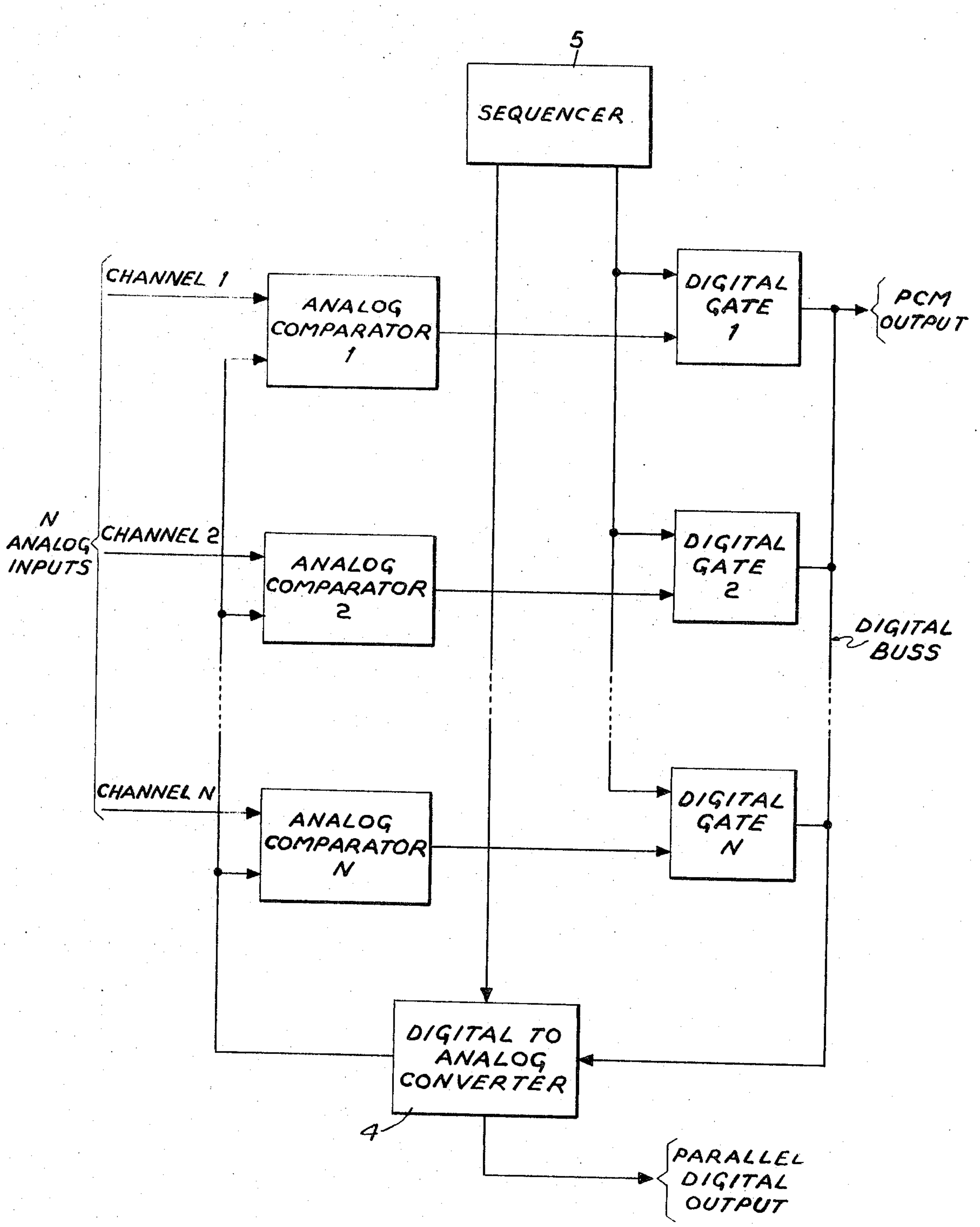
FIG. 2 is a functional block diagram of the inventive time division multiplexer using digital gates.

FIG. 2 is a block diagram of a time division multiplexer according to the invention. As in FIG. 1, the multiplexer comprises n-channels. An analog voltage is continuously applied to one input of an analog comparator. The multiplexer comprises n such analog comparators, one in each channel. The output of digital-to-analog converter 4 is applied to the other input of each analog comparator. Sequencer 5 turns digital gate 1 ON and commands digital-to-analog converter 4 to apply a precision voltage equal to one-half analog full scale voltage to comparators 1 through *n*. The output voltage of digital-to-analog converter 4 is compared with the first analog input, and the comparator in channel 1 produces a YES output if the input analog voltage is greater than the digital-to-analog converter output (one-half full scale) or a NO output if the input analog voltage is less than the digital-to-analog converter output. It should be clear that the YES and NO signals may consist of logic level signals which are compatible with digital gates 1 through n. The YES or NO signal from comparator 1 is fed back to digital-to-analog converter 4 through the ON digital gate 1.

Sequencer 5 next commands digital-to-analog converter 4 to add one-fourth full scale voltage to the existing one-half full scale voltage if a YES is present or to subtract one-fourth scale full voltage if a NO is indicated. After the addition or subtraction, the digital-to-analog converter output will be three-fourths scale if a YES was received or one-fourth scale if a NO was received by the digital-to-analog converter. The digital-to-analog converter output and the input analog signal are then compared again. A YES signal will be generated by comparator 1 if the analog signal is greater than the output of digital-to-analog converter 4 or a NO signal if the input analog signal is less than the output of digital-to-analog converter 4. The output of comparator 1 is again fed back to digital-to-analog converter 4 through the ON digital gate 1. Sequencer 5 then causes digital-to-analog converter 4 to add one-eighth full scale to its output if a YES is present or to subtract one-eighth full scale if a NO signal is present. This half-split process (the same as used in conventional half-split approximation analog-to-digital converters), is continued until the desired number of binary digits have been generated. At the end of each analog conversion, the next digital gate is switched ON and the process repeated. When the last analog channel has been converted, sequencer 5 again energizes channel 1.

The output of the ON digital gate is a PCM wave train. During each analog-to-digital conversion, the binary digits are stored in digital-to-analog converter 4 and are available in parallel form at the end of the conversion.

Figure 3A:
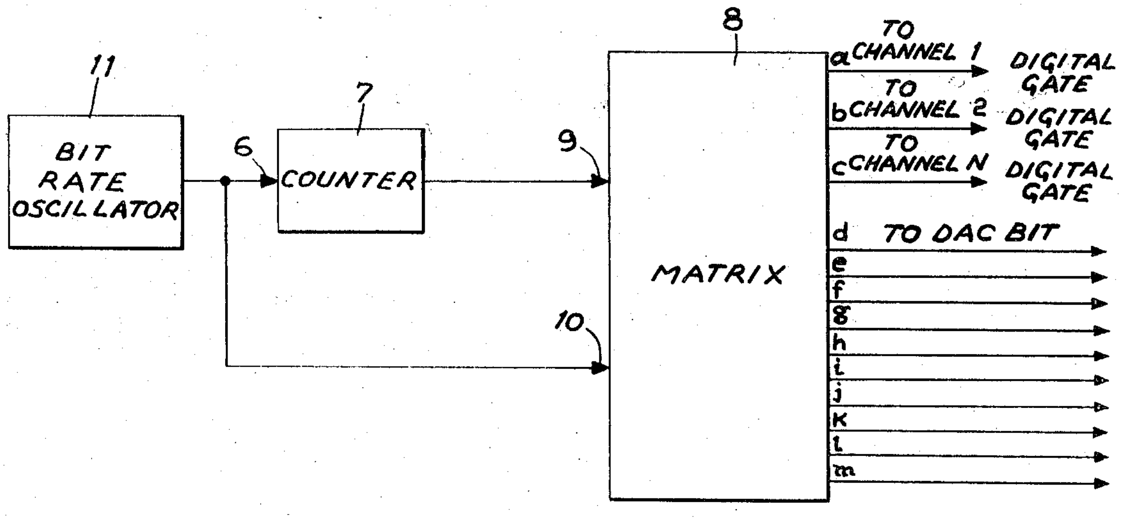
FIG. 3*a* is a simplified block diagram of the sequencer shown in FIG. 2.
Figure 3B:
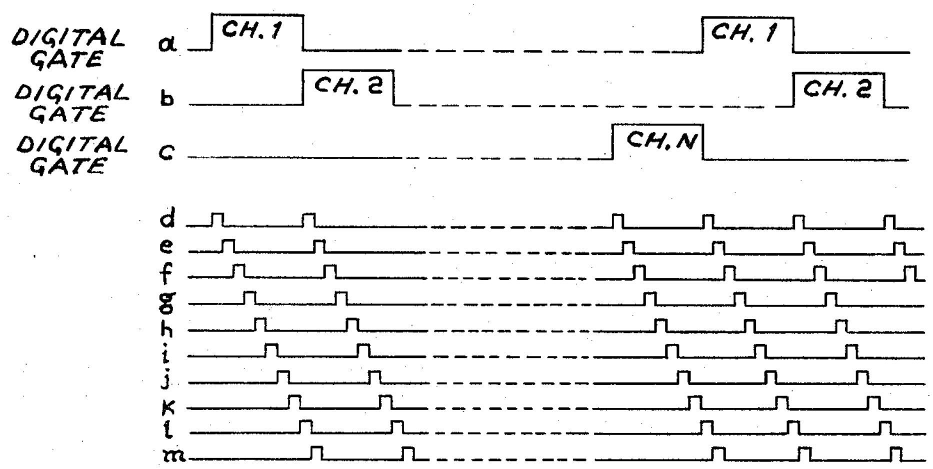
FIG. 3*b* illustrates the timing relationships of the sequencer output signals.

FIG. 3 is a simplified diagram of a sequencer for an n-channel, 10 bit systems. The sequencer generates the various timing and sequential gating pulses, shown in FIG. 3*b*, required for the operation of the multiplexer shown in FIG. 2. A counter 7 receives a clock input on input terminal 6 from a bit rate oscillator 11. Counter 7 counts the bit rate down to channel rate. The output of counter 7 is applied to a matrix 8 via input terminal 9. Matrix 8 also receives the clock signal from bit rate oscillator 11 on input terminal 10. Matrix 8 consists of a set of digital gates configured to generate individual bit and channel pulses. The outputs of matrix 8 comprise in part *n* lines which transmit sequential pulses to the individual digital gates in each channel of the time division multiplexer, shown in FIG. 2, to sequentially switch the gates ON. The sequential pulses for enabling the individual gates in each channel are shown on lines *a*, *b*, and *c* of FIG. 3*b*.

Matrix 8 also generates sequential bit pulses which drive the digital-to-analog converter gates. The bit pulses are routed to the digital-to-analog converter on individual lines labled *d*, *e*, *f*, *g*, *h*, *i*, *j*, *k*, *l* and *m*, and each is gated, within digital-to-analog converter 4, with the output of the ON digital gate. The resultant signal then determines, via control within digital-to-analog converter 4, whether the next most significant bit will be added or subtracted. The sequential bit pulses corresponding to outputs *d* through *m* of matrix 8 are shown in FIG. 3*b*. It should be noted from FIG. 3*b* that 10 sequential bit pulses are generated during the time duration of each digital gate enabling pulse.

It should be clear that counter 7 and matrix 8 are simple logic element units and could be designed in various ways depending on the preferences of the logic designer. Therefore, a more detailed description of them is not deemed necessary. Further, digital-to-analog converters suitable for use in the time division multiplexer of FIG. 2 for carrying out the half-split process until the desired number of binary bits have been generated, stored and made available in the form of a parallel digital output, are commercially available. One such device is a high reliability general purpose D/A converter (DAC 372 series) manufactured by Hybrid Systems Corp. Burlington, Massachusetts. The DAC 372 series D/A converters all have inputs of 12 bits, but are internally adjusted for linearities that conform to resolutions of from 8 to 12 bits. The offset and scale factor of the voltage output types have been internally factory trimmed, although provision is included to enable these parameters to be externally adjusted if desired. Either bipolar 2's complement or unipolar binary operation may be selected by pin interconnection.

In summary, a time division multiplexer has been provided which avoids the use of electronic analog gates and their inherent adverse effects, while still providing the desired result of time division multiplexing and analog-to-digital conversion.

It is to be understood that the foregoing description of specific examples of this invention is made by way of example only and is not to be considered as a limitation on its scope.

We claim:

1. An improved multi-channel time division multiplexer for multiplexing a plurality of analog signals and generating a PCM output and a parallel digital output, comprising:

a digital-to-analog converter having an input, an analog output and a plurality of parallel digital outputs;

a plurality of analog comparators, one in each channel, having first and second inputs, said first input coupled to a different one of said plurality of analog signals and said second input coupled to the analog output of said digital-to-analog converter, and having a bistable output which assumes a first state if said analog signal is greater than said digital-to-analog converter analog output and a second state if said analog signal is less than said digital-to-analog converter analog output;

a plurality of digital gates, one in each channel, having first and second inputs and an output, said first input coupled to the output of said analog comparator in the same channel and said output coupled to the outputs of the remaining digital gates, for forming said multiplexer PCM output and said digital-to-analog converter input; and a sequencer control unit having a first plurality and second plurality of outputs each of said first plurality consisting of pulses at channel rate, coupled to said second input of one of said plurality of digital gates, and said second plurality, consisting of pulses at bit rate, coupled to said digital-to-analog converter, whereby the voltage of each of said analog signals is converted into an n-bit binary number according to the half-split approximation process.

2. A multi-channel time division multiplexer according to claim 1 wherein said sequencer control unit comprises:

a bit rate oscillator;

a digital counter coupled to the output of said bit rate oscillator for counting the bit rate down to channel rate; and a digital matrix coupled to the output of said counter for generating said first plurality of channel rate signals and said second plurality of bit rate signals.

3. A multi-channel time division multiplexer according to claim 2 wherein said bit rate is 200 kc and said channel rate is 20 kc.

* * * * *